United States Patent [19]
Klein

[11] 3,899,924
[45] Aug. 19, 1975

[54] STRAIN GAUGE SYSTEM
[75] Inventor: Richard Edward Klein, Des Plaines, Ill.
[73] Assignee: Eaton Corporation, Cleveland, Ohio
[22] Filed: June 7, 1973
[21] Appl. No.: 367,828

[52] U.S. Cl. ............................... 73/141 A; 177/136
[51] Int. Cl. ......................... G01l 1/22; G01g 19/08
[58] Field of Search ........... 73/88.5 R, 88 R, 141 A, 73/141 R; 177/136, 210, 211; 323/75 C, 75 A, 79; 324/71 R

[56] References Cited
UNITED STATES PATENTS

| | | | |
|---|---|---|---|
| 2,815,480 | 12/1957 | Ruge | 73/88.5 R X |
| 2,894,197 | 7/1959 | Berry | 323/79 |
| 3,193,762 | 7/1965 | Wu | 73/88.5 R X |
| 3,283,838 | 11/1966 | Fetterman et al. | 177/136 X |
| 3,443,652 | 5/1969 | Videon | 177/136 |
| 3,650,340 | 3/1972 | Bradley | 177/136 |
| 3,669,756 | 6/1972 | Bradley | 177/136 |

FOREIGN PATENTS OR APPLICATIONS

| | | | |
|---|---|---|---|
| 191,844 | 1/1967 | U.S.S.R. | 73/88.5 R |

*Primary Examiner*—Jerry W. Myracle
*Assistant Examiner*—Stephen A. Kreitman
*Attorney, Agent, or Firm*—Teagno & Toddy

[57] ABSTRACT

A strain gauge system incorporating a plurality of pairs of strain gauges, each of which is mounted on an axle or the like, said strain gauges being connected in a plurality of bridge circuits, each having an independent power supply, with the bridge circuits being connected in series to produce an output voltage which is proportional to the total load. A manually operable voltage source is connected with the output of the bridge circuits, and an operational amplifier is connected with the voltage source to sense when the output voltage of the bridge circuit equals the manually selected voltage. An output signal is produced selectively when a null condition is reached or when a condition corresponding to a predetermined load is approached from either direction.

6 Claims, 7 Drawing Figures

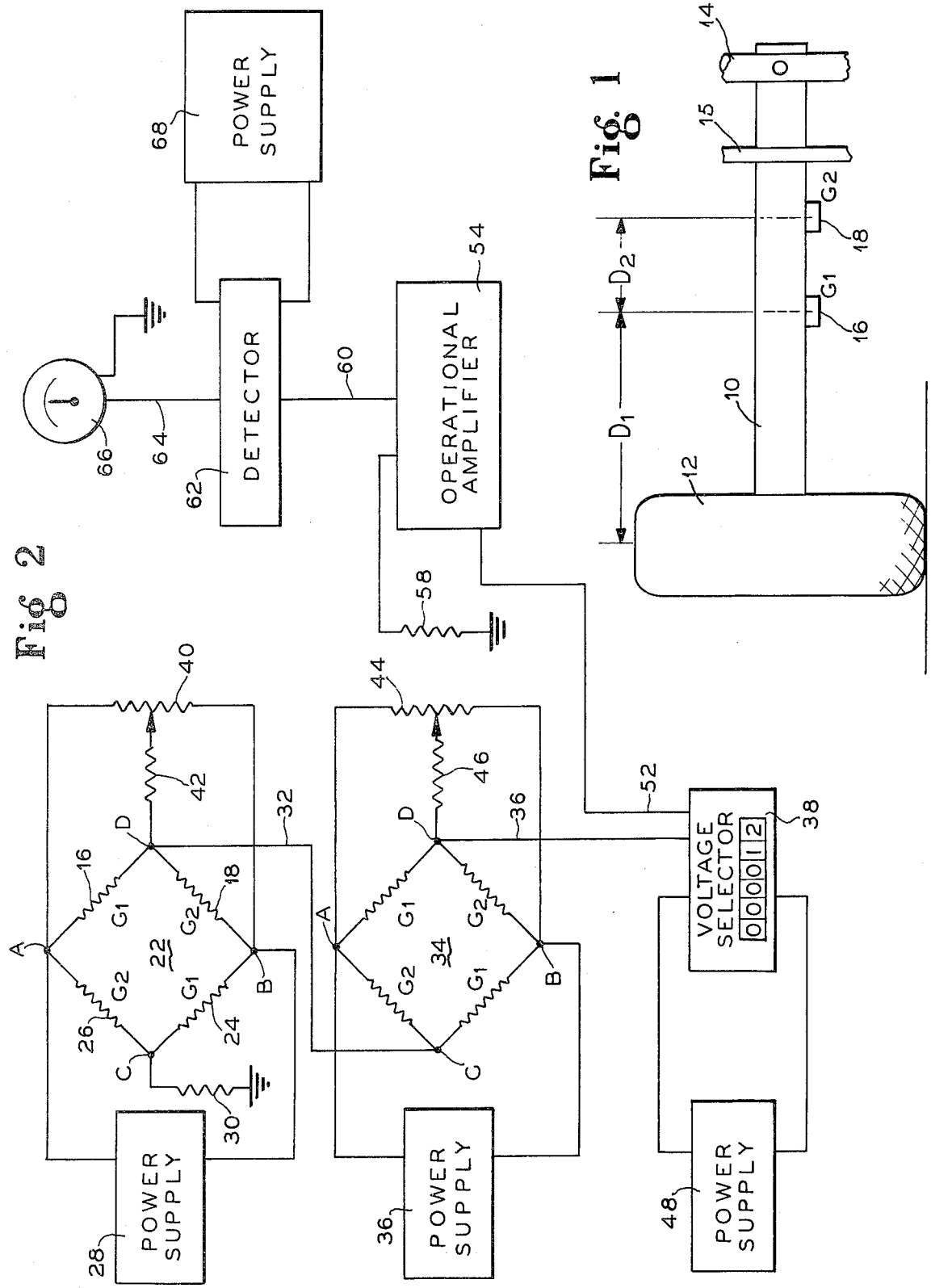

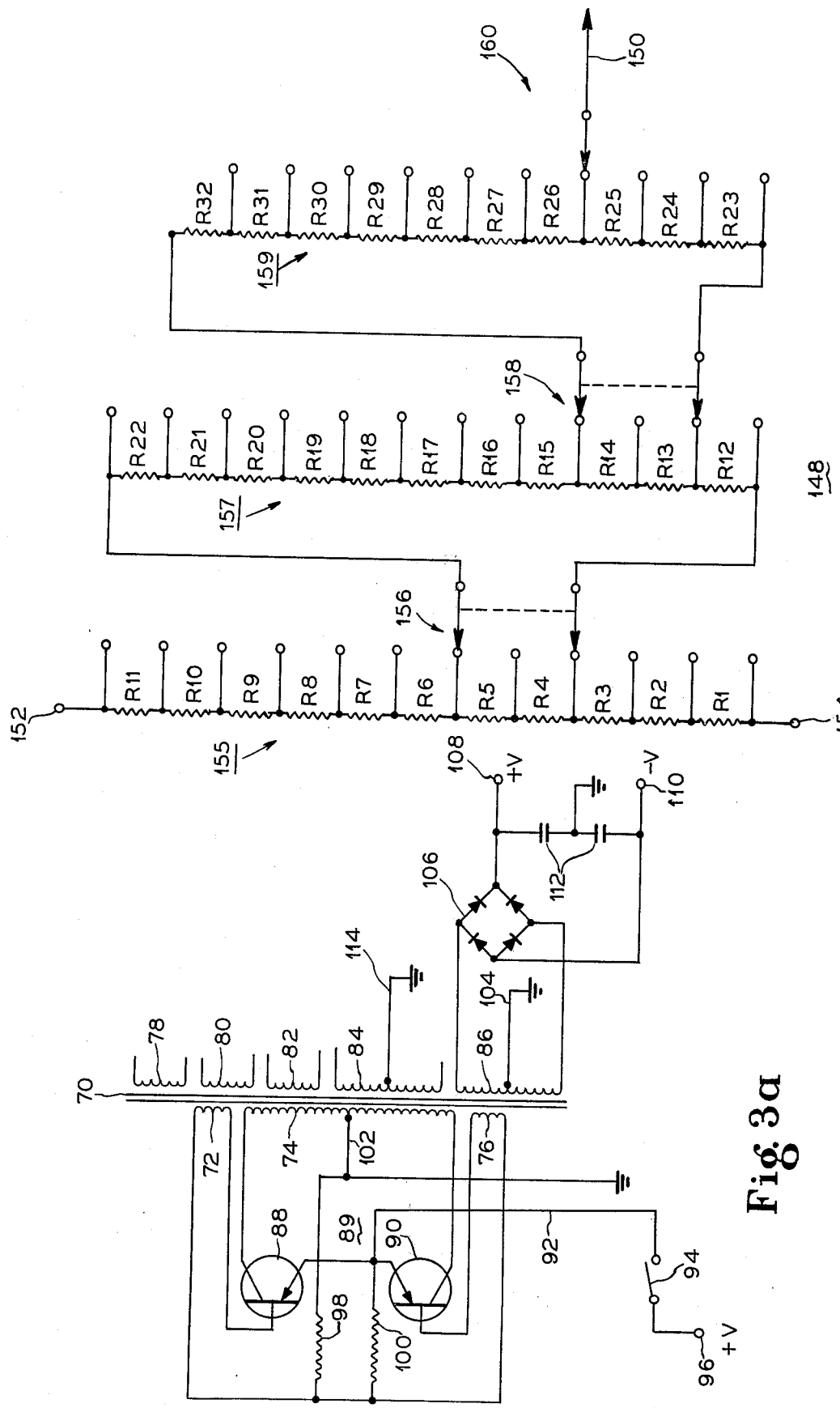

STRAIN GAUGE SYSTEM

BACKGROUND

1. Field of the Invention

The present invention relates to strain gauge systems, and more particularly, to such systems as are employed with wagons, trucks, trailers, or the like, in order to furnish a remote indication of the total weight of the load.

2. The Prior Art

It has been customary in the prior art to use load cell systems for determining the total weight of loads supported by a vehicle, but such systems require a special kind of installation, which is not always convenient. When strain gauges are used, four strain gauges are required for each support member, such as an axle, a trailer tongue, or the like, in order to produce the required signals.

SUMMARY OF THE PRESENT INVENTION

It is a principal object of the present invention to provide a strain gauge system in which only a pair of strain gauges are required for each load supporting member.

Another object of the present invention is to provide a strain gauge system in which a digital voltage divider is employed to furnish an accurate indication of the total load being measured.

A further object of the present invention is to provide a strain gauge system employing a plurality of bridges, with an independent power supply for each of said bridges.

Another object of the present invention is to provide a strain gauge system employing a plurality of bridges in which each of said bridges is excited by a square wave.

Another object of the present invention is to provide a strain gauge system employing a plurality of bridges with each of said bridges incorporating strain gauges associated with two separate load supporting members.

A further object of the present invention is to provide a strain gauge system having means for indicating a coincidence between a manually selected voltage and a voltage produced at the output of a bridge circuit.

These and other objects of the present invention will become manifest upon an examination of the following description and the accompanying drawings.

In one embodiment of the present invention there is provided a plurality of strain gauges, each pair of strain gauges being connected to an individual load supporting member, the output terminals of at least one pair of strain gauges being connected in bridge configuration with the output of terminals of another pair of strain gauges, a manually selectable voltage source connected with the output of said bridge, an operational amplifier connected with said manually selectable voltage device, and means connected to the output of said operational amplifier and responsive thereto for indicating a coincidence between the voltage produced by said bridge circuit and said manually selected voltage.

BRIEF DESCRIPTION OF THE DRAWINGS

Reference will now be made to the accompanying drawings in which:

FIG. 1 is a side elevational view of a load supporting member with a pair of strain gauges attached thereto;

FIG. 2 is a schematic circuit diagram, partly in functional block diagram form, of a strain gauge system incorporating an illustrative embodiment of the present invention;

FIGS. 3a and 3b are schematic circuit diagrams illustrating certain portions of FIG. 2 in greater detail;

FIG. 4 is a schematic circuit diagram of the manually selectable voltage divider employed with the apparatus of FIG. 3b;

DESCRIPTION OF THE PREFERRED EMBODIMENT

Figure 3B:
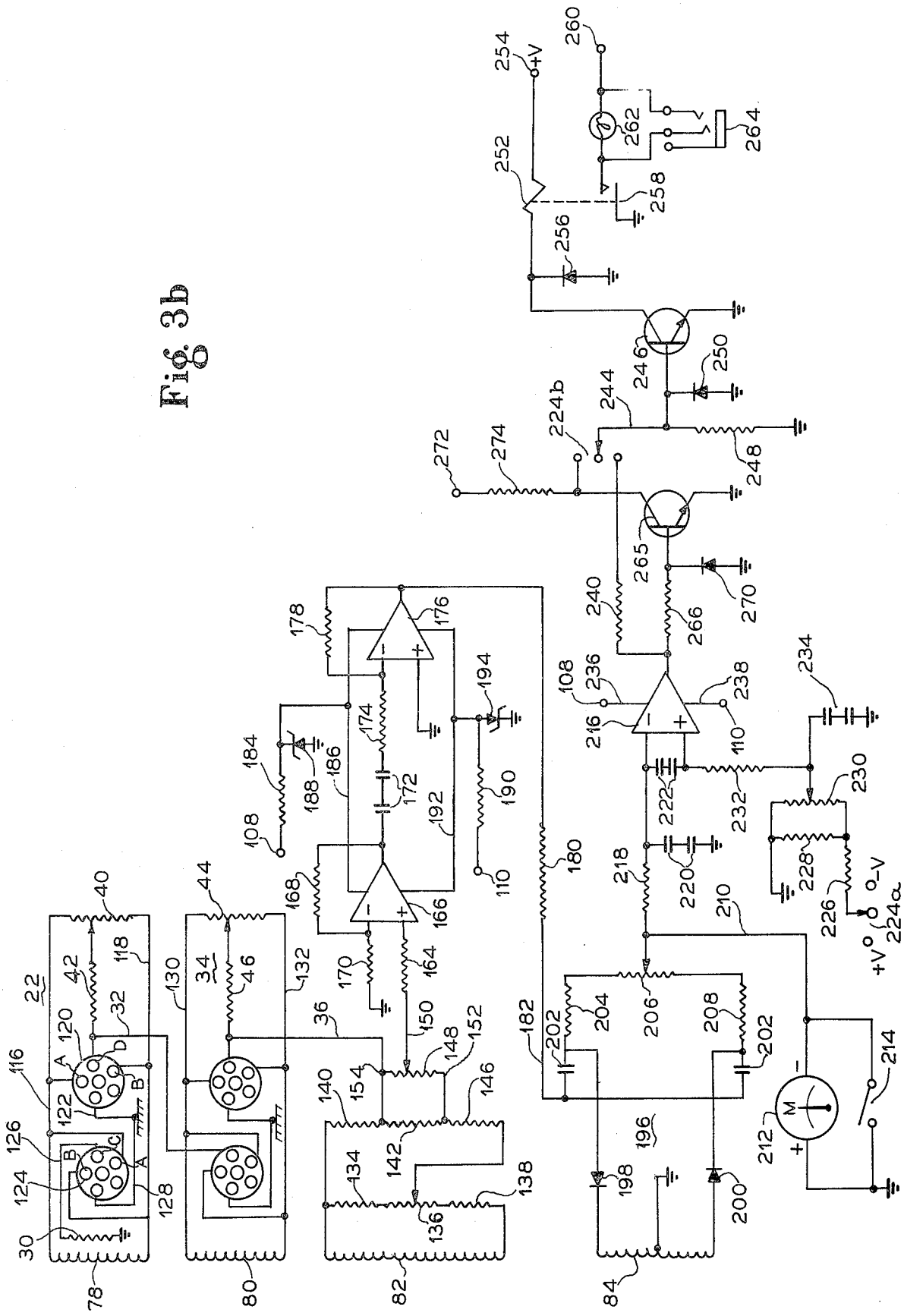

Referring first to FIG. 1, a side elevation of a load supporting member in the form of an axle 10 is connected at one end with a wheel or the like upon which a tire 12 is supported, and is supported at its other end by a frame member 14. A set of bearings (not shown) are provided for mounting the wheel on the axle 10. A member 15 is illustrative of the body of the vehicle, which carries the payload.

A pair of strain gauges 16 and 18 are mounted at spaced apart locations on the axle 10, and the relative impedance of the gauges 16 and 18 is a function of the load applied to the axle through the member 15. The strain gauge 16 is positioned a fixed distance D1 away from the end of the axle 10, which is supported by the wheel upon which is mounted the tire 12. The strain gauges 16 and 18 are spaced apart by a fixed distance D2 on the axle 10. The strain gauge 16 will be referred to as the G1 strain gauge, while the strain gauge 18 will be referred to as G2 strain gauge.

As shown in FIG. 2, the G1 strain gauge 16 and the G2 strain gauge 18 are connected as two legs of a bridge 22, with another pair of gauges including a G1 strain gauge 24 and a second G2 strain gauge 26 completing the bridge circuit. The G1 strain gauges 16 and 24 are both located at opposite legs of the bridge, and the G2 strain gauges 18 and 26 are also located at opposite legs of the bridge. A power supply 28 is connected between the top and bottom terminals of the bridge, illustrated in FIG. 2 as the A and B terminals; and the other two terminals, namely, the C and D terminals, produce an output having a voltage which corresponds to the sum of the imbalance of the two pairs of strain gauges making up the bridge 22. The C terminal is connected to ground through a resistor 30, and the D terminal is connected by a line 32 to the C terminal of a second bridge 34. The bridge 34 is identical to the bridge 22 in construction and operation. It is powered by an independent power supply 36, and furnishes a voltage between its output terminals C and D which is representative of the sum of the imbalance of the two pairs of strain gauges making up the bridge 34. The output of the bridge 34 is connected from the D terminal over a line 36 to a voltage selector unit 38.

The bridge 22 has a potentiometer 40 connected between the A and B terminals with its tap connected through a resistor 42 to the D terminal. Adjusting the position of the tap of the potentiometer 40 permits the bridge 22 to be balanced so as to produce a zero voltage between the C and D terminals when the load is zero. In this way, the weight of the body of the vehicle itself may be compensated for, so that the empty weight of the vehicle does not produce any voltage at the output of the bridge 22.

The bridge 34 is provided with a potentiometer 44 having its end terminals connected between the A and B terminals of the bridge 34 and its tap connected by a resistor 46 to the D terminal of the bridge. In this way, the bridge 34 may also be balanced for zero load, in the same manner as the bridge 22. Accordingly, when the vehicle is empty, the voltage present on the line 36 is zero, but differs from zero as the vehicle is loaded.

When the system is employed with a truck or trailer having four load supporting axles, the four pairs of strain gauges included in the bridges 22 and 34 are each located on a different one of the four axles. When the system is employed with a trailer or wagon having only two load supporting axles and a tongue, only three pairs of strain gauges are required, and the strain gauges 24 and 26 are replaced with fixed value resistors or strain gauges on a metal member.

A third independent power supply 48 is connected with the voltage selector unit 38, which is manually operable to select a voltage for connection in series between the line 36 and a line 52, which connects the selector unit 38 with an operational amplifier 54.

The amplifier 54 has one input connected to the line 52 and a second input connected to ground through a resistor 58. The output of the amplifier 54 is connected a line 60 to a detector unit 62. The detector unit is responsive to the output of the amplifier 54 present on the line 60 to indicate when a null condition is reached, in which the voltage produced by the selector unit 38 is equal and opposite to the voltage on the line 36. The output of the detector 62 is connected through an output line 64 to a meter 66, which indicates when the null condition is reached. The detector 62 is powered by a further independent power supply 68.

Referring now to FIGS. 3a and 3b, schematic diagrams illustrating the details of certain portions of the apparatus of FIG. 2 are illustrated. As shown in FIG. 3a, a transformer 70 has three primary and control windings 72, 74, and 76, and five secondary windings 78, 80, 82, 84, and 86. The three primary and control windings are connected with an oscillator 89 including a pair of pnp transistors 88 and 90. The two transistors 88 and 90 function to produce an exciting voltage which is applied to the primary winding 74, such that square wave signals are produced in all of the secondary windings 78–86. The two transistors 88 and 90 have their emitters connected together and in common with a line 92, which is connected through an on and off switch 94 to a source of positive potential at a terminal 96. When the switch 94 is opened, the voltage is removed from the transistors 88 and 90, and the circuit is inactive. When the switch 94 is closed, however, power is applied to the emitters of the transistors 88 and 90, and the oscillator 89 begins to oscillate.

The base of the transistor 88 is connected through the winding 72 and a resistor 98 to ground, and the base of the transistor 90 is connected through the winding 76 through the resistor 98 to ground. In addition, the junction between the resistor 98 and the windings 72 and 76 is connected by a resistor 100 to the emitters of the two transistors 88 and 90. The collectors of these two transistors are connected to opposite terminals of the primary winding 74, and a center tap of the winding 74 is connected to ground through a line 102. The two windings 72 and 76 function as control windings for furnishing the feedback signals to the oscillator 89 which are required for oscillation.

The secondary winding 86 is provided with a center tap to ground over a line 104, and a full wave bridge rectifier 106 produces a positive potential which is applied to a terminal 108 and a corresponding negative potential which is applied to a terminal 110. A pair of capacitors 112, connected to ground from the terminals 110 and 112, provide filtering. The secondary winding 84 is also provided with a center tap, connected to ground over a line 114.

The winding 78 has its two ends connected to lines 116 and 118, respectively (FIG. 3b), which correspond to the points A and B of the bridge 22 (FIG. 2). The strain gauges 16 and 18 are connected in circuit with a bridge through a connector 120. The connector 120 includes connections to points A, B, and D of the bridge 22, with the point D being connected through the connector 120 to the line 32. A further connection connects to ground the shield surrounding the cable interconnecting the connector 120 with the strain gauges 16 and 18.

Another connector 124 functions to connect the strain gauges 24 and 26 into circuit with the bridge 22. It furnishes connections between the strain gauges 24 and 26 and the lines 118 and 116, and a further connection through a line 126 which is connected to ground through the resistor 30. A fourth wire 128 connects the cable shield to ground.

The winding 80 has its ends connected to lines 130 and 132, which correspond to points A and B of the strain gauge 34 of FIG. 2. The strain gauge bridge 34 is constructed in the identical manner to the strain gauge 22, and furnishes a signal which is connected in series between the line 32, which connects the two bridges 22 and 34 and the line 36.

The winding 82 has its end terminals connected through a series circuit including a resistor 134, a potentiometer 136, and another resistor 138. The junction of the resistor 134 and the terminal of the winding 82, to which it is connected, is connected to one end of a resistor 140, the other end of which is connected through a resistor 142 and a resistor 146 to the tap of the potentiometer 136. A voltage divider 148 is connected in parallel with the resistor 142, and the line 36 is connected to the junction of the resistors 140 and 142. The tap of the voltage divider 148 is connected to an output line 150.

The G1 and G2 strain gauges making up each half of each bridge circuit change their impedance in response to the load that is applied to the load supporting members on which such strain gauges are mounted. This affects the output of each of the bridge circuits 22 and 34, so that the amplitude of the voltage which appears on the output line 36 is dependent upon the load applied to the load supporting members on which the strain gauges are mounted. Since both bridges 22 and 34 are excited with square wave voltages, the signal on the output line 36 is also a square wave. The square wave which is produced across the winding 82 is 180° out of phase with the square wave appearing on the line 36, so that that portion of the voltage across the voltage divider 148, which is selected between the line 36 and the tap of the voltage divider, is, in effect, subtracted from the voltage on the line 36. The result, on the line 150, is a square wave having an amplitude which is directly proportional to the difference between the load supported by the load supporting members and a factor corresponding to the position of the tap of the voltage divider 148.

The voltage divider 148 is of the Kevin-Varley type, the constructional details of which are illustrated in FIG. 4. A series of eleven resistors are connected in series circuit 155 between an input terminal 152 and a common terminal 154, and a multiposition doublepole switch 156 is adapted to connect the junction of two adjacent resistors R1–R11 to one end of a series circuit 157, including series connected resistors R12–R22. The other pole of the switch 156 connects the other end of the circuit 157 to the junction between two adjacent resistors of the circuit 155, which is spaced two resistors away from that selected by the first pole of the switch 156.

A further switch 158 is a two-pole multiposition switch similar to the switch 156, and is adapted to select two junctions of the circuit 157, spaced two resistors apart, for connection with opposite ends of a series circuit 159, including a string of resistors R23–R32. A further multiposition switch 160 is connected to select one of ten points of the circuit 159, at the bottom end of the circuit, and nine junctions of two adjacent resistors. The switch 160 supplies an output signal on the line 150.

The operation of the voltage divider illustrated in FIG. 4 is such that the fraction of the input voltage supplied to the output line 150 is a function solely of the position of the switches 156, 158, and 160. In one embodiment, the resistors R1–R11 are each 1 k ohm, the resistors R12–R22 are each 200 ohms, and the resistors R23–R32 are each 40.2 ohms. The three switches of the voltage divider are preferably provided with actuating knobs having pointers or the like, so that the position of each of the actuating knobs can be readily determined in reference to a scale provided on a panel adjacent each of the switch actuating knobs. This scale is preferably in terms of pounds of total load, which the system is designed to measure, so that when a zero voltage condition is obtained, by manipulating the switches 156–160, the amount of total load may be read directly from the scales, in accordance with the positions of the switches. The values for the resistors R1–R32 given above permit the scales adjacent the switch actuating knobs to be in terms of decimal orders, since the effect of moving the switch 158 one position is one-tenth that of moving the switch 156 one position, and ten times the effect of moving the switch 160 one position. The potentiometer 136 is adjusted so that the input voltage applied to the voltage divider via the terminals 152 and 154 (which are connected across the resistor 142) is equal to the voltage which is present on the line 36 when the total load is a selected power of ten times a unit weight. Although only three stages are illustrated in FIG. 4 for three decimal digits, four or more could be used.

The line 150 (FIG. 3b) is connected through a resistor 164 to the noninverting input of a differential amplifier 166. The output of the amplifier 166 is connected through a resistor 168 with its inverting input, and then through a resistor 170 to ground. The resistor 168 establishes the gain of the amplifier. The output of the amplifier 166 is connected to a pair of series connected capacitors 172, and then through a resistor 174 to the inverting input of a differential amplifier 176, the noninverting input of which is grounded. A resistor 178 is connected from the output of the amplifier 176 to its inverting input, to establish the gain of the amplifier. The output is also connected through a resistor 180 to a line 182.

The power supply terminals of the amplfiers 166 and 176 are connected to the terminals 108 and 110. The terminal 108 is connected through a resistor 184 to a line 186 connected with the positive power supply terminals of the amplifiers 166 and 176. A zener diode 188 connects the line 186 to ground, to insure the correct positive voltage level. Similarly, the terminal 110 is connected through a resistor 190 to a line 192, connected to the negative power supply terminals of the amplifiers 166 and 176. A zener diode 194 connects the line 192 to ground to insure the correct potential.

The series network including the capacitors 172 and the resistor 174 functions as a high-pass filter to pass a pulse for each half cycle of the square wave applied to the input line 150. Thus, the signals applied to the line 182 comprise equal positive-going and negative-going pulses.

The line 182 is connected to the input of a phase detector 196, incorporating a pair of diodes 198 and 200, which are connected to opposite ends of the winding 84, the center tap of which is grounded. The diodes 198 and 200 are each connected through individual capacitors 202 to the line 182. The diodes 198 and 200 are oppositely poled, and the junctions of the diodes 198 and 200 with each of the capacitors 202 are connected to opposite ends of a series circuit including a resistor 204, a potentiometer 206, and a resistor 208. The potentiometer 206 has its tap connected by a line 210 to one terminal of a meter 212, the opposite terminal of which is grounded. The meter is short circuited by operation of the switch 214, when desired.

The diodes 198 and 200 are both rendered conducting when they are forward biased by the potential applied thereto by the winding 84, and when the diodes 198 and 200 are conducting, the potential on the line 210 is held approximately at ground level. During alternate half cycles of the square wave signal applied to the diodes by the winding 84, the diodes 198 and 200 are blocked; and during these half cycles, the signal present on the line 182 is free to pass through the capacitors 202 and the network including the resistors 204 and 208 to the line 210. Accordingly, the average voltage present on the line 210 is dependent upon the magnitude and phase of the voltage present on the line 182, and is indicated by the meter 212. When there is substantially no voltage present on the line 182, i.e., when the voltage on the line 150 is zero, the meter 212 registers zero and the circuit is indicated to be balanced. The amount of the total load may then be read from the scale adjacent the actuating knobs of the voltage divider 148. The balance is readily detected when the needle of the meter 212 is centered, in its zero position. When the needle of the meter 212 is to the right of center, it signifies one condition of imbalance between the amount of load and the scale indications of the voltage divider 148, and when the needle is to the left of center, the opposite imbalance condition is indicated. Balance may be rapidly effected by making the appropriate corrections in the settings of the various switches 156, 158, and 160 of the voltage divider 148. The meter 212 does not require an integrating network to indicate the average voltage on the line 210, because the relatively high frequency of the oscillator 89 is greater than the speed of response of the needle of the meter 212.

Means is also provided in the present invention for establishing a pre-set level for a predetermined desired total load and for indicating when such a load has been reached, during loading or unloading a vehicle. For example, if it is desired to load a truck or wagon with a certain quantity of grain or the like, that quantity may be set into the system, and the system then automatically indicates when that load is reached during a loading process, or alternatively, during an unloading process.

An operational amplifier 216 has its inverting input connected to the line 210 through a resistor 218. The inverting input is also connected to ground through a pair of capacitors 220 and to the noninverting input through a pair of capacitors 222.

A double-pole multiposition switch 224 has one pole 224a provided for selecting positive or negative source of voltage for connection to a resistor 226. When the pole 224a is in contact with the left-hand terminal, as shown in FIG. 3b, a positive source of potential is selected, while a negative source is selected when the pole 224a is in contact with its right-hand terminal.

The opposite end of the resistor 226 is connected through a resistor 228 to ground, and a potentiometer 230 is connected in parallel with the resistor 228. The tap of the potentiometer 230 is connected through a resistor 232 to the noninverting input of the amplifier 216 and to ground through a pair of capacitors 234. The potentiometer 230 is operated to select a predetermined potential for application to the noninverting input of the amplifier 216. This potential may be either positive or negative, in accordance with the position of the switch 224. When the switch 224 is in a central position, the source of potential is removed from the noninverting input of the amplifier 216.

The power terminals of the amplifier 216 are connected by means of lines 236 and 238 to the terminals 108 and 110, and the output of the amplifier 216 is connected through a resistor 240 to one terminal of a second pole 224b of the switch 224. Another terminal of the pole 224b is connected to the collector of a transistor 265, the base of which is connected through a resistor 266 to the output of the amplifier 216. The emitter of the transistor 265 is grounded, and its base is connected to ground through a diode 270. The collector is also connected to a source of positive potential at a terminal 272 through a resistor 274.

The common terminal of the pole 224b is connected to a line 244, and the line 244 is connected to the base of a transistor 246 and to ground through a resistor 248 and a diode 250. The emitter of the transistor 246 is grounded, and the collector is connected through a relay coil 252 to a source of positive potential at a terminal 254. A diode 256 connects the collector of the transistor 246 to ground for protection of the transistor.

The relay coil 252 has associated therewith contain 258 adapted to complete a circuit from a source of positive potential at a terminal 260 through a lamp 262 to ground. In addition, a jack 264 is provided for the connection of remote equipment in parallel with the lamp 262.

In operation, when the desired load value is set by selection of the position of the tap of the potentiometer 230 and the negative potential is selected by the pole 224a, the output of the amplifier 216 is initially low. The low potential is applied through the lower contact of the pole 224b to the base of the transistor 246, cutting off the transistor. As the amount of load carried by the vehicle changes, eventually the two inputs to the differential amplifier 216 become equal, and the next incremental increase in load causes the amplifier 216 to produce a positive voltage which operates the transistor 246 and actuates the relay coil 252. The contact 258 then closes to energize the lamp 262 and the circuitry connected in parallel therewith.

When the switch 224 is operated to its other position, with the pole 224a selecting a positive potential and the pole 224b selecting its upper terminal, the collector of the transistor 265 is connected to the base of the transistor 246. The transistor 265 functions as an inverter, so that when the output of the amplifier 216 is high, the transistor 246 is cut off. As the load supported by the vehicle is changed, the two inputs to the amplifier 216 become equal, and the output of the amplifier 216 is reduced to zero, thereby cutting off the transistor 265 and allowing the transistor 246 to saturate by application of a positive potential through the resistor 274 from the terminal 272. By proper selection of the condition of the switch 224, the lamp 262 is energized, either when the amount of load is reduced to the desired value or when the amount of load is increased to the desired volume.

Figure 5:
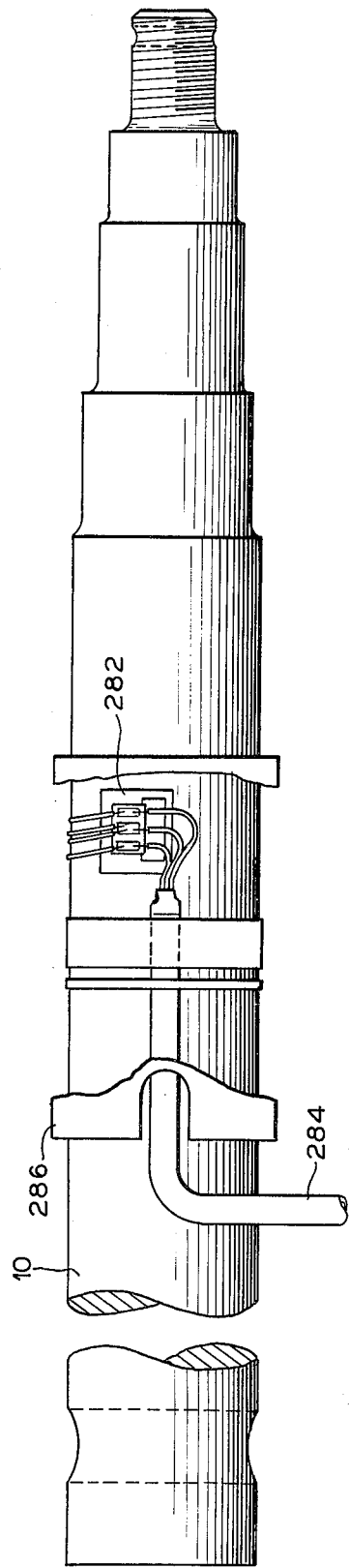
FIG. 5 is a plan view of an axle assembly which has a pair of strain gauges associated therewith.
Figure 6:
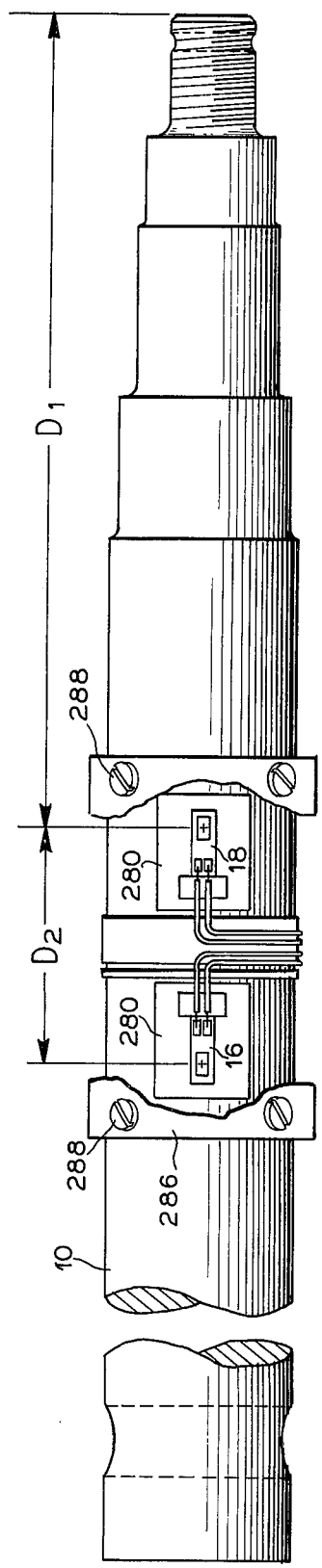
FIG. 6 is a bottom view of the axle illustrated in FIG. 5.

Referring now to FIGS. 5 and 6, the preferred manner of securing the strain gauges to an axle is illustrated. As illustrated in FIG. 6, the strain gauges 16 and 18 are adhesively secured directly to the axle 10 by means of a coating 280 of adhesive between the axle and the strain gauges. The two strain gauges 16 and 18 are accurately positioned on the axle a known distance from each other, as indicated by the dimension D2, and a known distance from the supported end of the axle, as indicated by the dimension D1. Each of the strain gauges has a pair of leads connected to the terminals thereof which are taped to the axle and form a half circle surrounding the axle so that they are brought to the other side of the axle for attachment to a terminal strip 282. The strain gauges 16 and 18 and the terminal strip 282 are all insulated from the axle 10, so that the axle does not form a part of the electrical circuit included in the strain gauges.

The terminal strip 282 incorporates three terminals, one for each of the three wires of the strain gauge assembly, one wire being connected in common with the two strain gauges 16 and 18 and the other two being connected individually with the other terminal of the gauges. The three terminals are connected to three wires of a three-wire shielded cable 284, which serves to connect the strain gauges with the remainder of the circuitry via connectors 120, 124, etc. A sleeve 286 surrounds the assembly including the strain gauges, the terminal strip, and the inner end of the cable 284; and the space between the axle 10 and the sleeve 286 is fully encapsulated with an insulating resin material to protect the strain gauges and the terminal strip against the effects of moisture and humidity and the like and to maintain the sleeve 286 in position. The sleeve 286 protects the strain gauge assembly from mechanical damage. During the process of encapsulation, the sleeve 286 may be retained in position on the axle by means of a plurality of screws 288. Preferably, the screws 288 are removed after encapsulation is complete, so that the mechanical characteristics of the sleeve 286 do not affect the strain of the axle 10.

It will be appreciated from the foregoing that a system incorporating the present invention is adapted to quickly and easily determine the precise total load applied to a number of load supporting members upon which strain gauges are mounted. Only two strain gauges need be mounted on each of the load supporting members, so that the disadvantage of the prior art systems (which require four such strain gauges, two on the bottom and two on the top of each load supporting member) is overcome. The provision of independent power supplies for each of the bridges in which the strain gauges are connected permits the series connection of the bridge circuits to establish a composite total output voltage corresponding to the total load applied to all of the load supporting members on which the strain gauges are mounted. This feature overcomes the need to separately total the various axles of a vehicle and then add the results together. In addition, the present invention is advantageously employed to furnish an output signal when a predetermined load has been reached, with the predetermined load being approachable from either an increasing or a decreasing direction.

The provision of the Kevin-Varley voltage divider circuit permits rapid and accurate manual selection of voltages corresponding to voltages produced by the strain gauge bridge circuits, so that the total load is automatically and accurately displayed by the dials associated with the knobs of the voltage divider.

It is evident that minor modifications and changes may be made in the present invention without departing from the essential features of novelty thereof, which are intended to be defined and secured by the appended claims.

What is claimed is:

1. A strain gauge load measuring system comprising a pair of strain gauges mounted on a load-supporting member, each of said strain gauges being located at a different predetermined distance from a supported end of said member, bridge circuit means interconnected with said strain gauges for deriving a signal having an amplitude dependent upon an actual load supported by said member, manually settable voltage divider means for setting a first reference signal to represent a first reference load, detector means connected with said bridge circuit means and with said voltage divider means for producing a signal indicating a net difference between said actual load signal and said first reference signal, means for producing a second manually adjustable reference level to represent a partial load, and comparator means for comparing said net difference signal and said second reference level and operative to produce a binary signal indicating the polarity of said net difference signal relative to said second reference level, whereby said binary signal is in a first binary state when said net difference signal is one one side of said second reference level and in a second binary state when said net difference signal is on the other side of said second reference level.

2. A strain gauge load measuring system as defined in claim 1 and further comprising manual selectively operable sign-controlling means connected with said second reference level means for selectively assigning a positive and negative sign to said second reference level to characterize said partial load selectively as an increment and decrement of load relative to said first reference load, and further comprising first switch means for selectively rendering said comparator means responsive to conditions in which said net difference signals has a positive or a negative polarity relative to said second reference level.

3. A strain gauge load measuring system as defined in claim 2 and wherein said sign-controlling means includes second switch means arranged for simultaneous operation with said first switch means.

4. A strain gauge load measuring system as defined in claim 1 and further comprising indicating means connected with said detector means for indicating when said net difference signal is zero, whereby said indicating means indicates when said actual load is equal to said first reference load set in said voltage divider means.

5. A strain gauge load measuring system as defined in claim 1 and further comprising an additional pair of strain guages mounted on an additional load supporting member, and wherein said bridge circuit has four legs composed of the two pairs of said strain gauges, whereby each of said bridge circuits produces an output voltage proportional to the total load supported by the two load supporting members.

6. A strain gauge load measuring system as defined in claim 5 and including additional ones of said load supporting members and said bridge circuits, and means for connecting the output voltages produced by each of said bridge circuits in series to produce a composite total output voltage corresponding to the load supported by all of said load supporting members.

* * * * *

UNITED STATES PATENT OFFICE
CERTIFICATE OF CORRECTION

Patent No. 3,899,924　　　　　　　　　Dated August 19, 1975

Inventor(s) Richard E. Klein

It is certified that error appears in the above-identified patent and that said Letters Patent are hereby corrected as shown below:

Col. 3, line 26:　　At the beginning of the line insert the word ---through---.

Col. 7, line 57:　　"contain" should read---contacts---.

*Signed and Sealed this*

*second* Day of *December 1975*

[SEAL]

Attest:

RUTH C. MASON
*Attesting Officer*

C. MARSHALL DANN
*Commissioner of Patents and Trademarks*